Feb. 7, 1928.
W. L. HANLEY, JR
1,658,333
TUNNEL KILN
Original Filed Oct. 8, 1925   3 Sheets-Sheet 1
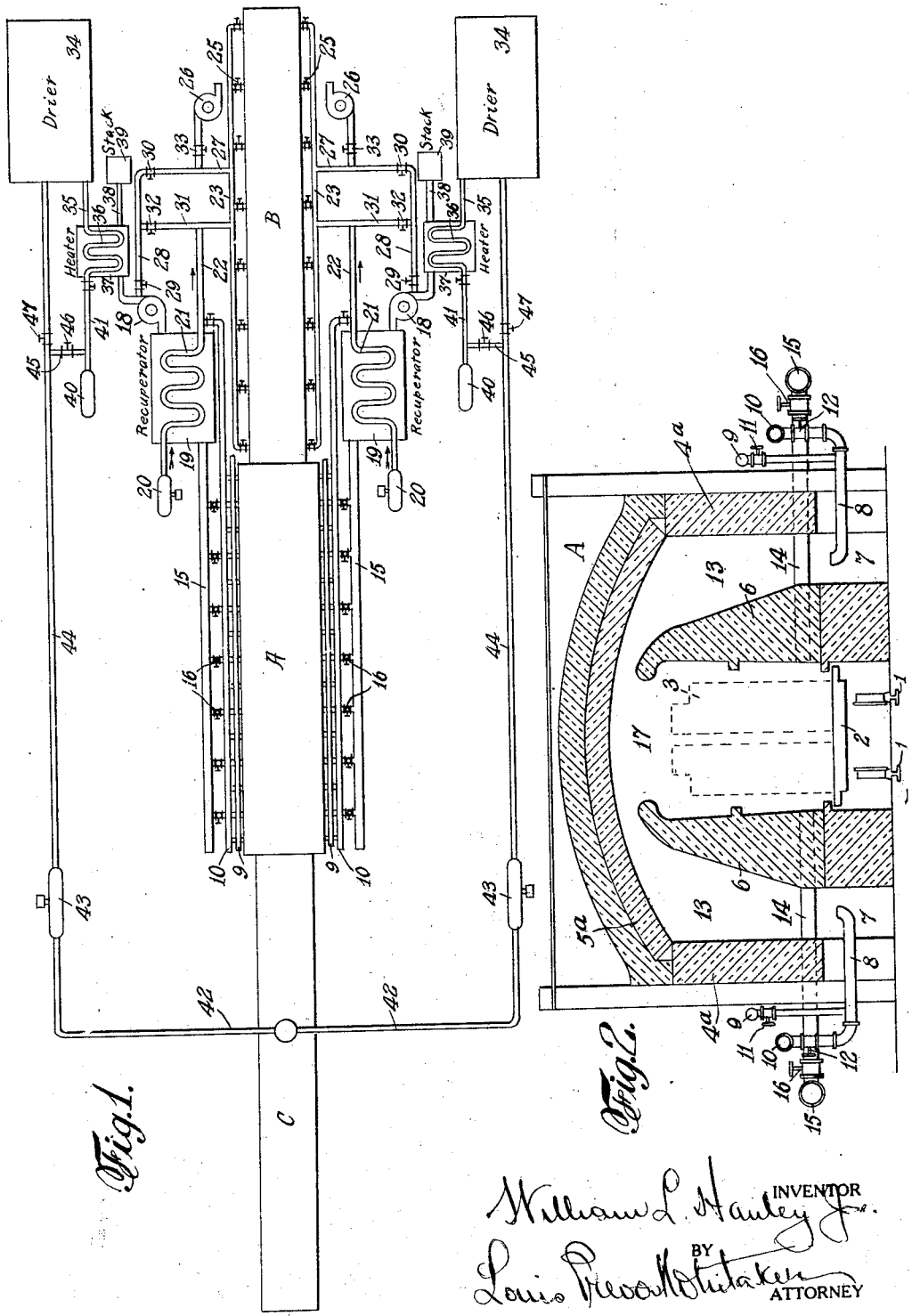

Feb. 7, 1928.
W. L. HANLEY, JR
1,658,333
TUNNEL KILN
Original Filed Oct. 8, 1925    3 Sheets-Sheet 2
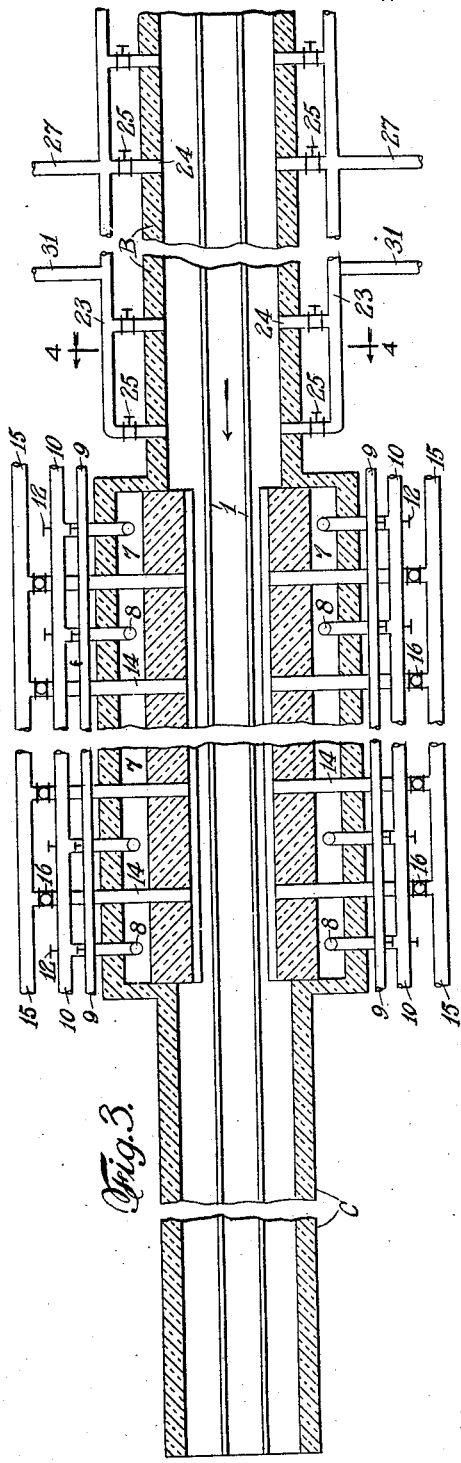
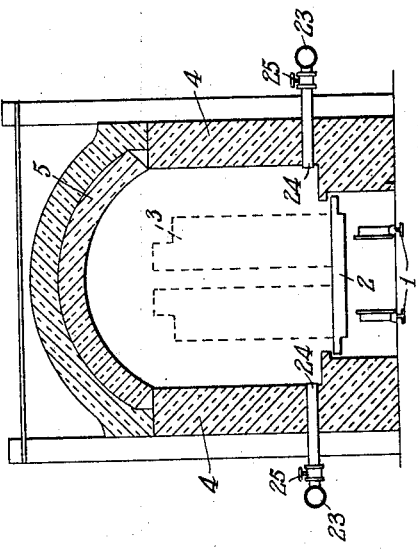
INVENTOR
William L. Hanley Jr.
BY
Louis Prevost Whitaker
ATTORNEY Feb. 7, 1928.
W. L. HANLEY, JR
1,658,333
TUNNEL KILN
Original Filed Oct. 8, 1925  3 Sheets-Sheet 3
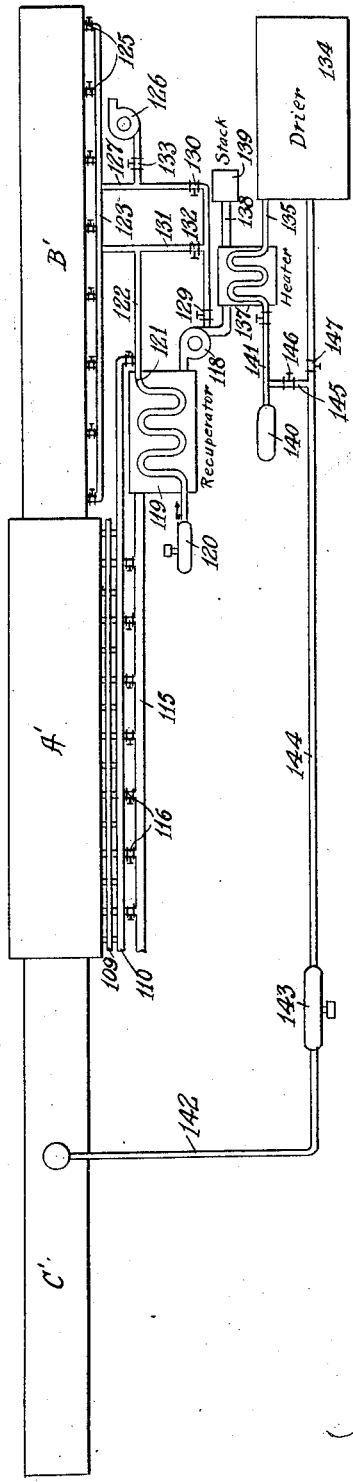
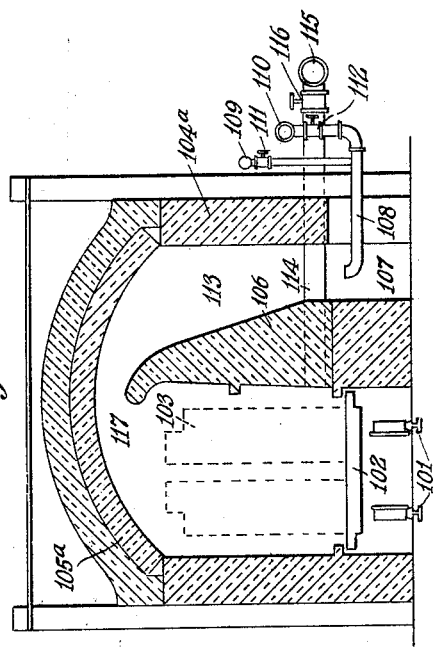

Patented Feb. 7, 1928.

1,658,333

UNITED STATES PATENT OFFICE.

WILLIAM LEE HANLEY, JR., OF BRADFORD, PENNSYLVANIA.

TUNNEL KILN.

Application filed October 8, 1925, Serial No. 61,361. Renewed July 7, 1927.

My invention consists in the novel features hereinafter described, reference being had to the accompanying drawing, which illustrates one embodiment of the same, and a slight modification thereof, selected by me for purposes of illustration, and the said invention is fully disclosed in the following description and claims.

The object of my invention is to produce a tunnel kiln, especially adapted for the firing of bricks and other coarse clay products. In the construction of such a kiln, it is desirable to employ a simple and economical structure in order to minimize the very large initial cost of the kiln, and also to keep down the expenses of upkeep and repair. In carrying my present invention into effect, I employ a single tunnel structure which is entirely free from longitudinal flues or passages, so that it can be very cheaply constructed. The central portion of the tunnel constitutes the firing zone, and is provided with furnaces which discharge their products of combustion directly into the firing zone so as to impart the greatest possible heat to the goods and economize fuel. At each end of the firing zone there is a long tunnel section, in one of which the goods are preheated, water-smoked and oxidized, and in the other of which the fired bricks are cooled. The presence of the products of combustion in the preheating zone, would have the effect of interfering with the proper oxidation of the clay products, and also of scumming or staining the brick during the water-smoking thereof, and in order to prevent the products of combustion from passing into the preheating zone, I provide means for withdrawing the products of combustion completely from the firing zone and the kiln after they have performed the function of firing the brick, and I further provide for the passing of these products of combustion through a recuperator, or heat interchanger, wherein the heat of the products of combustion is imparted to fresh clean air, which is delivered into the preheating section of the kiln at intervals along the same, and under the control of regulating valves, so that the temperature of the preheating section may be gradually increased from the entering end of the kiln to the firing zone, whereby the temperature of the dried bricks, or other products is gradually raised and the bricks are water-smoked and oxidized, without danger of staining or scumming, and are passed into the firing zone at the entering end thereof, at substantially the temperature of the entering end of the firing zone. I also prefer to heat the firing zone by a plurality of furnaces arranged longitudinally thereof, and operated under the control of suitable regulating valves, or dampers, controlling the fuel supply and air supply to the furnaces, and to further provide the passages for the withdrawal of the products of combustion from the firing zone with suitable dampers, or controlling valves, to the end that the temperature in various parts of the firing zone may be regulated so as to gradually increase from the entering end to the discharging end of said zone, according to a predetermined rising heat curve.

The products of combustion, when they leave the firing zone, will be at extremely high temperature, and they will, therefore, heat the air in the heat exchanger or recuperator, to a very high degree, making it readily possible to properly preheat the goods in the preheating zone, up to substantially the temperature of the entering end of the firing zone. The products of combustion, after leaving the heat exchanger, still contain a very considerable amount of heat, and I prefer to employ this heat for the purpose of heating additional quantities of clean, fresh air, which is supplied to a drier, or driers, in which the products are dried before entering the kiln. In this connection, I also prefer to withdraw the air from the cooling zone, or section, of the tunnel kiln, by means of suitable pipes, and to conduct it through a recuperator, or heat exchanger, or other suitable device, or directly to the drier, so that the heat of the fired brick may also be conserved and utilized for the drying of brick or other products, preparatory to firing. My invention also contemplates the provision for employing a certain quantity of the products of combustion after they have imparted some of their heat to the air in the recuperator, to the preheating of the goods and also the provision of means for mixing with these combustion gases, cool, clean air, and also clean preheated air from the recuperator, as may be desired, and under the control of the operator by means of suitable valves, or dampers. I also provide means for preheating the air employed in the furnaces for the combustion of the fuel by passing it through the recuperator on its way to the burners, or furnaces.

In the accompanying drawings, which illustrate two embodiments of my invention, selected by me for purposes of illustration, Fig. 1 is a diagrammatic plan view of a single tunnel kiln, embodying my invention, Fig. 2 represents a transverse sectional view through the firing zone, drawn to an enlarged scale.

Fig. 3 is an enlarged horizontal sectional view of the kiln, partly broken away.

Fig. 4 is a section on the line 4—4 of Fig. 3, through the preheating zone.

Fig. 5 is a view similar to Fig. 1, showing a slight modification thereof.

Fig. 6 is an enlarged transverse sectional view through the firing zone of the kiln illustrated in Fig. 5.

Referring to the form of the invention illustrated in Figs. 1 to 4 inclusive, the kiln comprises a continuous single track tunnel, of which the central portion, indicated at A, is the firing chamber, containing the firing zone, from the opposite ends of which the two end sections of the tunnel extend, the section B, being the preheating zone, and the section, C, being the cooling zone. A single line of tracks, indicated at 1—1, extends longitudinally through the entire kiln and in operation the track is occupied by a continuous line of tunnel cars, 2, each supporting a carload of bricks, or other coarse clay or ceramic products to be fired, indicated at 3, in dotted lines in Fig. 2. It will be understood that the kiln provides a longitudinal goods space or passage, extending from one end of the kiln to the other, without either transverse or longitudinal partitions, and without any longitudinal flues. The end portions, B—C, of the tunnel, are of very simple construction, and comprise the side walls, 4—4, and the crown, 5, which may be of ordinary brick or any other suitable material. The central portion, A, of the tunnel, which comprises the firing chamber, is also a single tunnel structure, comprising the side walls, 4ª—4ª, and crown, 5ª, the side walls being spaced further apart in order to accommodate the interior baffle walls, or longitudinal partitions, 6—6, see Fig. 2, and the furnaces, indicated at 7—7. The furnaces may be of any desired construction and designed for the consumption of any type of fuel, solid, liquid or gaseous, as may be preferred. In Fig. 1, I have shown a line of furnaces, 7, on each side of the firing chamber, A, but the furnaces may be located at one side only, if preferred, as indicated in Figs. 5 and 6, in some instances, within the scope of my present invention. In this instance I have shown the furnaces provided with a series of burners, indicated at 8, for a mixture of gas and air, the gas and air being supplied by pipes, 9—10, respectively under the control of valves, 11 and 12, respectively, so that each individual furnace may be independently regulated to the end that a predetermined heat curve may be maintained, gradually increasing from the entering end of the heating chamber, or heating zone, to the discharging end thereof. For example, a temperature of from, say 900°, to 1400° F., more or less, may be maintained at the entering end of the firing zone, the temperature of the different portions of the firing zone increasing more or less gradually to a temperature of 1800° to 2100° F., more or less, at the discharge end adjacent to the cooling zone, C. The products of combustion discharged from the furnaces are conducted upward through passages, indicated at 13, between the side walls of the kiln and the adjacent baffle walls, 6, and the upper ends of the baffle walls are preferably provided with inwardly extending portions at the top and also at one or more points below the top on the inner faces of the baffle walls, in order to cause the hot products of combustion to descend through the goods on the cars, instead of between the goods and the baffle walls, as far as possible. Adjacent to each furnace, I preferably provide a pipe or passage, indicated at 14, extending from the inner face of the baffle wall to the exterior of the kiln, where it is connected with a header, 15, for withdrawing the products of combustion from each furnace adjacent thereto. This arrangement assists in the control of the temperature at different points longitudinally of the firing zone, and helps to maintain the heat curve desired. These eduction pipes, 14, are also provided each with an independent damper, indicated at 16, so that they may be independently controlled to assist in controlling the temperature within the furnace, and to also insure the withdrawal of all the products of combustion from the interior of the firing zone, which is indicated at 17. In order to secure the proper withdrawal of the products of combustion any suitable type of eduction device, as a suction fan or blower, indicated at 18, for example, may be employed. These products of combustion leave the firing zone at a very high degree of heat, ranging in the neighborhood of approximately 1800° F., and being the products of combustion from all of the furnaces combined. As before stated, I remove the products of combustion to prevent the staining and scumming of the bricks in the preheating zone, and to prevent the oxidation thereof from being interfered with, and I propose to use this heat to heat clean, fresh air which can thereby be heated to a temperature of approximately 1400° F., and to use this heated fresh air for preheating the bricks, in the section B of the kiln. For this purpose, I prefer to employ a recuperator, or heat interchanger, of any preferred character, in which the products of combustion will be conducted separate from the air to be heated. In the present instance I have shown the recuperator, indicated at 19, to receive the products of combustion, and heat the fresh air, which is driven by a fan, 20, through a heating coil, 21, or pipe system, or passages, of the recuperator, and is discharged in highly heated condition through the pipe, 22. I have shown a recuperator for each row of furnaces, but obviously a single recuperator of sufficient capacity could be employed where two sets of furnaces are used. The highly heated air which leaves the recuperator at approximately 1400° or even higher, is delivered to a header, 23, extending along the preheating section of the kiln, said header being connected by transversely extending pipes, or passages, 24, see Fig. 4, with the interior of the kiln, for preheating the bricks. These pipes, or passages, 24, are also provided with valves or dampers, 25, so that the desired temperatures in different portions longitudinally of the preheating zone, B, may be maintained. Necessary air for insuring the proper combustion in the furnaces may also be taken from the pipe, 22, in highly heated condition, most suitable for supplying the furnaces, through the pipes, 10—10. In some instances it may be desirable to supply cool, fresh air to the preheating section, in addition to the highly heated, fresh air, from pipe, 22, and I have illustrated an additional fan, 26, for this purpose connected with a cool air supply pipe, 27, which may lead to the header, 23, or to a separate header, if preferred, for supplying cool, fresh air to the preheating section, B, of the kiln throughout a portion, or its entire length as preferred.

I am aware that it has been proposed to remove the heated air from a compartment in which fired bricks are cooled, and introduce it in the preheating section of the kiln, for the purpose of preheating the bricks, but such air is not sufficiently highly heated to effect the preheating, water-smoking and oxidation of the bricks preparatory to burning, in a satisfactory manner. I have found, however, that by taking the products of combustion directly out of the firing zone, at the very high temperature resulting at that point, and employing them for the purpose of heating air to a very high degree, as 1400° or higher, that this air can be utilized in the preheating zone or chamber of the kiln very efficiently to produce preheating, water-smoking and oxidation. In some instances, and with some kinds of products, it may be found desirable to introduce some of the products of combustion after they have given up a portion of their heat in the recuperator, 19, into a portion of the preheating zone, for the purpose of preheating the products therein, on their way to the firing zone of the kiln. I have, therefore, shown, for example, a pipe, indicated at 28, extending from the fan or suction device, 18, on the pressure side thereof, to, and in this instance, connected with the pipe, 27, leading to the header, 23, the pipe, 28, being controlled by the valves, 29—30, so that certain portions of the hot products of combustion, after leaving the recuperator, may be deflected to the preheating zone of the kiln, and delivered thereto, in the presence of a sufficient quantity of fresh atmospheric air containing free oxygen, so as not to stain or scum the products, or interfere with their proper oxidation. If desired, a certain amount of fresh, highly heated air from the recuperator, may be diverted to mix with the products of combustion, leaving the recuperator, in case they are delivered into the interior of the preheating chamber, B, and for this purpose, I have shown a branch pipe, 31, extending from the pipe, 22, to the pipe, 28, and controlled by a valve, 32. In some instances it may be desirable to temper the products of combustion passing through the pipe, 28, to the preheating chamber of the kiln, and in such case a certain amount of cool, fresh air may be admitted by the pipe, 27, under the control of a separate valve, 33. By the proper manipulation of these several valves, 29, 30, 32 and 33, any desired combination of products of combustion with heated fresh air, or cool, fresh air, or both, may be obtained and delivered into the preheating zone. The products of combustion, after leaving the recuperator, still possess a very high degree of heat, and I propose to employ this residue of heat for the purpose of heating fresh air for use in drying the coarse clay products before they pass into the kiln. Thus, in the drawings, Fig. 1, I have shown at each side of the kiln, a drier, indicated at 34, connected by a pipe, 35, with a coil, or passage, indicated at 36, in a heater, 37, through which the discharge end of the suction fan is connected, the products of combustion passing thence through a pipe, 38, to a stack, 39, and thence to the atmosphere. The air passing through the heater, 37, may be supplied through a fan, or blower, 40, from the atmosphere and delivered by a pipe, 41, into the drier.

I also prefer to provide means for withdrawing the air from the cooling chamber, C, of the kiln, which will become very highly heated by radiation and convection, from the burned brick or other products, as they pass through the cooling section, C, of the kiln, and this hot, fresh air, is preferably delivered to the drier, or driers, for the purpose of drying the green products before they enter the kiln. In this instance I have shown pipes, 42, connected with exhaust fans, 43, which are in turn connected by pipes, 44, with the drier. In some instances it may be desired to pass this hot, fresh air withdrawn from the cooling chamber, C, through the heater, 37, before it reaches the drier, and I have shown, for example, in Fig. 1, branch pipes, 45, for connecting the pipes, 44, with the pipe, 41, leading to the drier, the pipes, 45, being provided with a valve, 46, and the pipe, 44, being provided with a valve, 47, by which the air from the cooling chamber may be delivered in either of the two ways indicated, or both as preferred.

In Figs. 5 and 6 I have shown a modified form of my invention, in which the firing zone is indicated at A′, the preheating zone at B′ and the cooling zone at C′, and the other corresponding parts are indicated by the same numerals with the addition of 100. The construction and operation of the kiln shown in Figs. 5 and 6 is exactly the same as that illustrated in Figs. 1 to 4, except that in Figs. 5 and 6, I have shown the firing zone, A′, heated by a set of furnaces, 107, extending on one side only and provided with a single baffle wall, 106, there being only one recuperator shown in connection with these furnaces. The other features of construction and operation are combined in this kiln in exactly the same manner and for the production of exactly the same results as previously described with reference to Figs. 1 to 4, inclusive.

From the foregoing description it will be understood that in the operation of my improved kiln, a row of tunnel cars will extend entirely through the length of the kiln on the track rails, and that the entire train is moved in the direction of the arrow in Fig. 3, either continuously or intermittently, by any usual or preferred means, and that as a car of fired bricks passes out from the discharge end of the kiln at the outer end of the cooling section, or chamber, a car of green products is inserted at the entering end of the kiln into the preheating chamber, B. In the preheating chamber, B, the clay products are gradually heated, oxidized and water-smoked, in the presence of air containing a sufficient quantity of oxygen, to insure proper oxidation, and prevent staining or scumming, the bricks being gradually heated as they progress slowly through the preheating chamber, to a temperature approximately equal to the temperature within the firing zone at its entering end adjacent to the preheating chamber, B. The products then pass lengthwise through the firing chamber, being exposed to gradually increasing temperature, until they are fully fired and leave the firing zone, and pass into the cooling chamber, C. In passing lengthwise through the cooling chamber, they give up their heat to the air, which is withdrawn through the pipes, 42, and conducted to the drier, either directly, or through the heater, 37, as preferred. The products of combustion are withdrawn from the firing zone and pass through the recuperator to heat fresh air, which is used in the preheating chamber to preheat the dried products, after which they pass through the heater, 37, to perform another heating of air for the drier.

It will be understood that the heater, 37, may be either exterior to, or within the drier, as preferred. As before stated, a portion of the products of combustion leaving the recuperator, 19, may be discharged into the preheating chamber, or a portion thereof, either with an admixture of hot air or cool air, or both, as may be found most desirable.

My improved kiln presents a very efficient and simple tunnel kiln, which is comparatively inexpensive to build and keep in repair, and which is highly efficient and economical in operation, with a very high output for a single tunnel kiln.

What I claim and desire to secure by Letters Patent is:—

1. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, means for utilizing the products of combustion withdrawn from the firing zone for heating air and discharging it into the preheating chamber to effect the preheating, water-smoking, and oxidation of the products, a cooling chamber connected with and extending from the opposite end of the firing chamber, and a single line of goods conveying means extending through the preheating chamber, firing chamber and cooling chamber.

2. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, a recuperator for receiving the products of combustion from the firing zone and transmitting its heat to fresh air admitted to the recuperator, means for conducting said heated air from the recuperator to the preheating zone, to effect the preheating, water-smoking and oxidation of the products, a cooling zone connected and extending from the opposite end of the firing zone, and a single line of goods conveying means extending through the firing chamber, preheating chamber, and cooling chamber.

3. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, a recuperator for receiving the products of combustion from the firing zone and transmitting its heat to fresh air, means for conveying said fresh heated air from the recuperator and delivering it at different points longitudinally of the preheating chamber for effecting the preheating, water-smoking and oxidation of the products, independent regulating means for controlling the admission of said fresh heated air at said separated points, a cooling zone connected and extending from the opposite end of the firing zone, and a single line of goods conveying means extending through the preheating chamber, firing chamber and cooling chamber.

4. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber, and cooling chamber, independent means for controlling said furnaces, means for withdrawing the products of combustion from the firing zone, a recuperator operatively connected with said withdrawing means for receiving the said products of combustion, said recuperator being provided with means for passing air therethrough for heating the same without commingling it with the products of combustion, means for delivering said heated air to the preheating chamber, means for utilizing the residual heat of said products of combustion after leaving the recuperator for heating additional quantities of air and means for delivering said additional quantities of heated air to a point of use, whereby said heated air may be used to dry products to be burned in the kiln.

5. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, means for utilizing the products of combustion withdrawn from the firing zone for heating air and discharging it into the preheating chamber to effect the preheating, water-smoking and oxidation of the products, a cooling chamber connected with and extending from the opposite end of the firing chamber, and a single line of goods conveying means extending through the preheating chamber, firing chamber and cooling chamber, and means for conducting heated air from the cooling chamber to a point of use, whereby said heated air may be used for drying products to be burned in the kiln.

6. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber, and cooling chamber, independent means for controlling said furnaces, means for withdrawing the products of combustion from the firing zone, a recuperator operatively connected with said withdrawing means for receiving the said products of combustion, said recuperator being provided with means for passing air therethrough for heating the same without commingling it with the products of combustion, means for delivering said heated air to the preheating chamber, means for utilizing the residual heat of said products of combustion after leaving the recuperator for heating additional quantities of air and delivering it to a point of use exterior to the kiln, and means for conducting the air heated by the cooling of the fired products to a point of use exterior to the kiln, whereby the residual heat of the products of combustion, and of the air heated by the cooling fired products may be used to dry products to be burned in the kiln.

7. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber, and cooling chamber, independent means for controlling said furnaces, means for withdrawing the products of combustion from the firing zone, a recuperator operatively connected with said withdrawing means for receiving the said products of combustion, the said recuperator being provided with means for passing air therethrough for heating the same without commingling it with the products of combustion, means for delivering said heated air to the preheating chamber, means for utilizing the residual heat of said products of combustion after leaving the recuperator for heating additional quantities of air and delivering it to a point of use, means for introducing cool fresh air into said preheating chamber, and controlling means for said heated air and cool air, whereby said preheating chamber is supplied with fresh air to insure the oxidation of the product, and whereby the temperature of different portions longitudinally of the preheating chamber may be controlled.

8. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber, and cooling chamber, independent means for controlling said furnaces, means for withdrawing the products of combustion from the firing zone, means for utilizing the products of combustion withdrawn from the firing zone for heating air and discharging said heated air into the preheating chamber, and means for discharging a portion of the products of combustion directly into said preheating chamber.

9. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber and cooling chamber, independent means for controlling said furnaces, means for withdrawing the products of combustion from the firing zone, means for utilizing the products of combustion withdrawn from the firing zone for heating air and discharging said air into the preheating chamber, and means for conducting a portion of said products of combustion after they have parted with a large portion of their heat to said air, into the preheating chamber, to assist said air in preheating, water-smoking and oxidizing the product.

10. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber and cooling chamber, independent means for controlling said furnaces, means for withdrawing the products of combustion from the firing zone, means for utilizing the products of combustion withdrawn from the firing zone for heating air and discharging said air into the preheating chamber, and means for conducting a portion of said products of combustion after they have parted with a large portion of their heat to said air, into the preheating chamber to assist said air in preheating, water-smoking and oxidizing the product, and means for mixing fresh cool air with the products of combustion so admitted into the preheating chamber for tempering the products of combustion so admitted and supplying additional quantities of oxygen thereto.

11. A single tunnel kiln comprising among its members, a centrally located firing chamber provided with a series of furnaces at different points longitudinally thereof discharging their products of combustion into the firing zone within said firing chamber, a preheating chamber located at one end of the firing chamber, and communicating therewith, a cooling chamber connected with and extending from the opposite end of the firing chamber, and a single line of goods conveying means extending through the preheating chamber, firing chamber and cooling chamber, independent means for controlling said furnaces, means for withdrawing the products of combustion from the firing zone, means for utilizing the products of combustion withdrawn from the firing zone for heating air and discharging said air into the preheating chamber, and means for conducting a portion of said products of combustion after they have parted with a large portion of their heat to said air, into the preheating chamber to assist said air in preheating, water-smoking and oxidizing the product, means for supplying portions of said heated air to the products of combustion admitted to the preheating chamber.

12. A single tunnel kiln comprising among its members, a centrally located firing chamber provided with a series of furnaces at different points longitudinally thereof discharging their products of combustion into the firing zone within said firing chamber, a preheating chamber located at one end of the firing chamber and communicating therewith, a cooling chamber connected with and extending from the opposite end of the firing chamber, and a single line of goods conveying means extending through the preheating chamber, firing chamber and cooling chamber, independent means for controlling said furnaces, means for withdrawing the products of combustion from the firing zone, means for utilizing the products of combustion withdrawn from the firing zone for heating air and discharging said air into the preheating chamber, and means for conducting a portion of said products of combustion after they have parted with a large portion of their heat to said air, into the preheating chamber to assist said air in preheating, water-smoking and oxidizing the product, means for supplying portions of said heated air to the products of combustion admitted to the preheating chamber, means for supplying fresh cool air to said products of combustion admitted to the preheating chamber, and independent controlling devices for regulating the heated air and cooled air admitted to said products of combustion.

13. A single tunnel kiln comprising among its members, a centrally located firing chamber provided with a series of furnaces at different points longitudinally thereof, discharging their products of combustion in a firing zone within said firing chamber, independent means for controlling said furnaces, and means for withdrawing the products of combustion from the firing zone, a preheating chamber located at one end of the firing chamber, a cooling chamber connected with and extending from the opposite end of the firing chamber, a single line of goods conveying means extending through the preheating chamber, firing chamber and cooling chamber, a recuperator for receiving the products of combustion withdrawn from the firing zone, means for passing fresh air through said recuperator, and delivering it to the preheating chamber, an air heating device, means for passing the products of combustion after they leave the recuperator, through said heating device, means for supplying air to said heating device, and means for conducting the air heated thereby to a point of use, whereby the heated air from said heating device may be used to dry products to be burned in the kiln.

14. A single tunnel kiln comprising among its members, a centrally located firing chamber provided with a series of furnaces at different points longitudinally thereof, discharging their products of combustion in a firing zone within said firing chamber, independent means for controlling said furnaces, and means for withdrawing the products of combustion from the firing zone, a preheating chamber located at one end of the firing chamber, a cooling chamber connected with and extending from the opposite end of the firing chamber, a single line of goods conveying means extending through the preheating chamber, firing chamber and cooling chamber, a recuperator for receiving the products of combustion withdrawn from the firing zone, means for passing fresh air through said recuperator, and delivering it to the preheating chamber, an air heating device, means for passing the products of combustion after they leave the recuperator, through said heating device, and means for withdrawing the air heated by the fired products within the cooling chamber and delivering said heated air to a point of use.

15. A single tunnel kiln comprising a centrally located firing chamber having a single firing zone within the same, a longitudinal row of furnaces at each side of the firing zone and discharging their products of combustion directly thereinto, longitudinally disposed baffle walls located at opposite sides of the firing chamber between each side of furnaces and the firing zone, independent means for controlling said furnaces for maintaining a gradually increasing temperature from one end of the firing zone to the other, said firing chamber being provided with eduction flues for withdrawing the products of combustion from the firing zone, a single preheating chamber located at one end of the firing chamber, a single cooling chamber located at the other end of the firing chamber, and a single line of goods conveying means extending through the preheating chamber, firing chamber and cooling chamber, means for utilizing the products of combustion withdrawn from the firing chamber for heating fresh air and conducting it to the preheating chamber, for preheating, oxidizing and water-smoking the products.

16. A single tunnel kiln, comprising a centrally located firing chamber having a single firing zone within the same and provided with a series of furnaces at different points longitudinally thereof, discharging their products of combustion into the firing zones, a baffle wall having portions between each furnace and the firing zones, independent means for controlling said furnaces for maintaining a gradually increasing temperature from one end of the firing zone to the other, said firing chamber being provided with eduction flues for withdrawing the products of combustion from the firing zone, a single preheating chamber located at one end of the firing chamber, a single cooling chamber located at the other end of the firing chamber, a single line of goods conveying means extending from the preheating chamber, firing chamber and cooling chamber, means for utilizing the products of combustion withdrawn from the firing zone for heating air and discharging said air into the preheating chamber, for preheating, water-smoking and oxidizing the products.

17. A single tunnel kiln, comprising a centrally located firing chamber having a single firing zone within the same and provided with a series of furnaces at different points longitudinally thereof, discharging their products of combustion into the firing zone, a baffle wall having portions between each furnace and the firing zones, independent means for controlling said furnaces for maintaining a gradually increasing temperature from one end of the firing zone to the other, said firing chamber being provided with eduction flues for withdrawing the products of combustion from the firing zone, a single preheating chamber located at one end of the firing chamber, a single cooling chamber located at the other end of the firing chamber, a single line of goods conveying means extending from the preheating chamber, firing chamber and cooling chambers, means for utilizing the products of combustion withdrawn from the firing zone for heating air and discharging said air into the preheating chamber, means for conducting a portion of said products of combustion after they have parted with a large portion of their heat to said air into the preheating chamber, to assist said air in preheating, water-smoking and oxidizing the products.

18. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, means for heating the preheating chamber to effect the preheating and water smoking of the products to be burned, a cooling chamber connected with and extending from the opposite end of the firing chamber, and a single line of goods conveying means extending through the preheating chamber, firing chamber and cooling chamber.

19. A single tunnel kiln comprising among its members, a centrally located firing chamber provided with a series of furnaces at different points longitudinally thereof discharging their products of combustion into a firing zone within said firing chamber, independent means for controlling said furnaces for maintaining a gradually increasing temperature from one end of the firing zone to the other, means for withdrawing the products of combustion from the firing zone, a preheating chamber located at one end of the firing chamber, means for heating air and delivering it into said preheating chamber, to effect the preheating and water smoking of the products to be burned, a cooling chamber connected with and extending from the opposite end of the firing chamber, and a single line of goods conveying means extending through the preheating chamber, firing chamber and cooling chamber.

In testimony whereof I affix my signature.

WILLIAM LEE HANLEY, Jr.